Patented June 17, 1952

2,600,596

UNITED STATES PATENT OFFICE 2,600,596

N-CARBOANHYDRIDES OF BETA-AMINO ACIDS OF AT LEAST FOUR CARBONS HAVING NONAROMATIC, ONLY SINGLY BONDED ALPHA CARBON

Hilmer Ernest Winberg, Wilmington, Del., assignor to E. I. du Pont de Nemours & Company, Wilmington, Del., a corporation of Delaware No Drawing. Application October 7, 1947, Serial No. 778,453

19 Claims. (Cl. 260—77.5)

This invention relates to derivatives of beta-amino acids. More particularly, it relates to the N-carboanhydrides of beta-amino acids and to their polymers.

The N-carboanhydrides of alpha-amino acids, i. e., the five-membered cyclic compounds of the formula

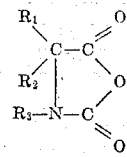

wherein the R's are hydrogen or organic radicals, have been known for a long time. It is also known that these compounds can undergo polymerization with evolution of carbon dioxide and formation of polyamides. However, the N-carboanhydrides of beta-amino acids, i. e., the six-membered cyclic compounds of the general formula

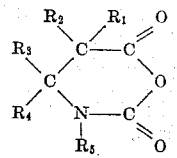

wherein the R's are hydrogen or organic radicals have not been described in the chemical literature except in two special cases where the N-carboanhydrides happened to be stable from the standpoint of sensitivity to water and heat. These were the isatoic anhydrides (from anthranilic acid and related substituted anthranilic acids) and the N-carboanhydride from beta-aminoacrylic acid. There is no published record of work on the N-carboanhydrides of those beta-amino acids in which the carbon alpha to the carboxyl group is aliphatic in nature and saturated. Moreover, there are no published general methods of making polyamides from beta-amino acids, although polymerization methods have been proposed in special cases such as the N-aryl beta-amino acids or those beta-amino acids where the carbon atom alpha to the carboxyl group bears no hydrogen atom (see application Serial Number 679,861, filed by R. S. Schreiber on June 27, 1946), now abandoned.

It is an object of this invention to provide a new class of hitherto unknown N-carboanhydrides of the beta-amino acids. Another object is to provide a process for preparing the N-carboanhydrides of beta-amino acids. A further object is to provide a general method of obtaining polyamides having recurring beta-amino acid units. A still further object is to provide a new class of polyamides. Other objects will appear hereinafter.

These objects are accomplished by the invention of the N-carboanhydrides of the beta-amino acids having at least four carbon atoms, including the carboxyl carbon, and wherein the carbon atom alpha to the carboxyl group is aliphatic, including cycloaliphatic, that is non-aromatic, in character and bears single bonds only and the amino nitrogen bears at least one hydrogen atom, and of the polymerization of these N-carboanhydrides with evolution of carbon dioxide to polyamides having a unit length of four.

The term "unit length" as used here has its usual and accepted meaning, i. e., the length of the recurring unit in the polyamide chain, in this case

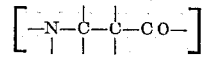

Polyamides prepared from beta-amino acids wherein the carbon alpha to the carboxyl bears at least one hydrogen atom and wherein the amino nitrogen is unsubstituted are believed to be new. There is no known method of preparing such polyamides. The present invention opens up the way for the preparation of these polymers.

In the preferred embodiment of the invention, the N-carboanhydride of a beta-amino acid is prepared by reacting the acid or its alkali metal salt with phosgene under anhydrous conditions, desirably in the presence of a solvent, inert toward phosgene, for the N-carboanhydride. The latter is then separated from the reaction mixture by appropriate means, including removal of the solvent if a solvent is used, and if desired purified by recrystallization. Polyamides can be prepared from the N-carboanhydrides by thermal decomposition, with or without catalysts which favor ring opening. Mixture of two or more N-carboanhydrides, or of N-carboanhydrides of beta-amino acids with N-carboanhydrides of alpha-amino acids may be used to obtain copolymers.

When reference is made herein to an amino acid, it is understood that what is meant is an amino carboxylic acid.

The invention is further illustrated in detail in the following examples in which parts are by weight.

Example I

Fifteen (15) parts of alpha,alpha-dimethyl-beta-aminopropionic acid (dried overnight in vacuum over phosphorus pentoxide) was placed in a glass reaction vessel protected from the atmosphere with drying tubes and provided with a gas inlet tube, a reflux condenser and a high speed stirrer. Six hundred and sixty-eight (668) parts of freshly distilled methylene chloride was added and gaseous phosgene (purified by passage through cottonseed oil and subsequently through concentrated sulfuric acid) was passed through the vigorously agitated suspension at 20–25° C. for 5 hours. The suspension was then filtered and the methylene chloride was removed from the filtrate by distillation under reduced pressure. There was obtained 2.66 parts of a white crystalline residue which, upon recrystallization from 57 parts of dry benzene, furnished 2.52 parts of the pure N-carboanhydride of alpha,alpha-dimethyl-beta-aminopropionic acid as white crystals melting at 126–127° C. with evolution of carbon dioxide and formation of polymer.

*Analysis.*—Calcd. for $C_6H_9O_3N$: C, 50.34; H, 6.34; N, 9.79. Found: C, 50.62, 50.89; H, 6.47, 6.54; N, 9.52, 9.61.

This compound is unstable to storage at room temperature. After four days, even though protected from moisture, the material is no longer completely soluble in methylene chloride and it melts at 105–110° C. with evolution of carbon dioxide and formation of polymer.

Example II

The N-carboanhydride of DL-beta-aminobutyric acid was prepared from 20 parts of the dry acid by the procedure described in Example I. Evaporation of the methylene chloride filtrate gave 0.71 part of the N-carboanhydride which, after recrystallization from a mixture of 12 parts of benzene and 1.5 parts of petroleum ether, was obtained as white crystals melting at 103° C. with vigorous evolution of carbon dioxide and rapid resolidification to a white polymer melting above 300° C. The N-carboanhydride of DL-beta-aminobutyric acid had the following composition:

*Analysis.*—Calcd. for $C_5H_7O_3N$: C, 46.51; H, 5.47; N, 10.85. Found: C, 46.66, 46.70; H, 5.60, 5.69; N, 10.70, 10.92.

Example III

Five parts of finely divided, dry, sodium beta-aminobutyrate was suspended in 67 parts of methylene chloride. Phosgene was passed through the suspension for 2 hours at 20–25° C., then for 30 minutes at the refluxing temperature of methylene chloride (40–42° C.). The methylene chloride solution was filtered off and evaporated to dryness, leaving the crude N-carboanhydride of beta-aminobutyric acid as white needles melting around 80° C. with evolution of carbon dioxide and formation of polymer.

Example IV

Using the procedure of Example I, 15 parts of DL-beta-phenyl-beta-aminopropionic acid was reacted with phosgene to give 2.65 parts of white crystalline N-carboanhydride which, after recrystallization from benzene, decomposed at 99° C. with evolution of carbon dioxide and formation of a polymer melting above 255° C.

Example V

Into a glass tube ending in a capillary was charged 1 part of the N-carboanhydride of alpha,alpha-dimethyl-beta-aminoproprionic acid, and the tube was immersed in an oil bath maintained at 130° C. Carbon dioxide was vigorously evolved and the material partly melted. Within 30 minutes, evolution of carbon dioxide had ceased and the molten material had solidified. After heating for a total of 60 minutes the weight loss closely approached that calculated for the formation of a polyamide by loss of carbon dioxide from the N-carboanhydride. The resulting polymer had the composition corresponding to the formula

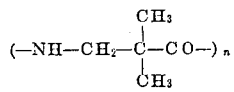

where $n$ is an integer. It was soluble in chloroform and in m-cresol and melted above 200° C. Its intrinsic viscosity in m-cresol was 0.17.

*Analysis.*—Calcd. for $C_5H_9ON$: C, 60.58; H, 9.15; N, 14.13. Found: C, 59.07, 59.19; H, 8.97, 9.10; N, 13.39, 13.44.

When the polymerization was conducted in solution by dissolving 1 part of the N-carboanhydride of alpha,alpha-dimethyl-beta-aminopropionic acid in 22 parts of chloroform and allowing the solution to stand at room temperature for three weeks, there was obtained a polyamide of similar general characteristics melting at 250° C.

Example VI

Upon heating the N-carboanhydride of beta-aminobutyric acid at 160° C., carbon dioxide was vigorously evolved. After five hours, the weight loss closely approached that calculated for the formation of a polyamide with complete removal of carbon dioxide. The resulting white polymer had a composition corresponding to the formula

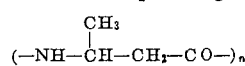

where $n$ is an integer. It melted at 315° C., was soluble in m-cresol and formic acid but insoluble in cyclohexanone, chloroform or benzene.

*Analysis.*—Calcd. for $C_4H_7ON$: C, 56.45; H, 8.30; N, 16.46. Found: C, 54.05; H, 8.04; N, 16.24.

The N-carboanhydride of beta-aminobutyric acid also polymerized on standing at room temperature. After two days' storage a sample had become insoluble in methylene chloride and did not melt below 200° C.

This invention contemplates as new products the N-carboanhydrides of those beta-amino acids which have at least four and not more than thirteen carbon atoms, have hydrogen on amino nitrogen and whose alpha-carbon atom is aliphatic, including cycloaliphatic in nature and bears only single bonds. The N-carboanhydrides contain one more carbon atom than the number of carbon atoms in the beta-amino acids from which they are derived and thus these new N-carboanhydrides contain at least 5 and not more than 14 carbon atoms, and preferably not more than 11 carbon atoms, including the two carbonyl carbon atoms. The N-carboanhydrides of the beta-amino acids falling under the above definition are crystalline solids which are water-sensitive and thermally unstable, and therefore amenable to polymerization through opening of the ring and evolution of carbon dioxide.

Since purification of the amino acids and of the N-carboanhydrides becomes more difficult when long-chain groups are present, and since long chain polyamides tend to melt too low for general plastics and fiber uses, the preferred amino acids as defined above are those which contain not more than 13 carbon atoms including the carboxyl carbon, and of those the most useful, because more readily available and more reactive, are those which contain not more than 10 carbon atoms including the carboxyl carbon. Additional examples of suitable products within the scope of the invention are the N-carboanhydrides of beta-phenyl-beta-N-methylaminopropionic acid, N-methyl-beta-alanine, N-benzyl-beta-alanine, 1-carboxy-2-aminocyclohexane, beta-phenylaminobutyric acid, beta-aminovaleric acid, alpha-methyl-beta-aminopropionic acid, beta-amino-pelargonic acid, beta-naphthylaminopropionic acid, beta-methylaminobutyric acid, beta-methyl-beta-aminobutyric acid, alpha-phenyl-beta-aminopropionic acid, etc.

The N-carboanhydrides of this invention thus have the general formula

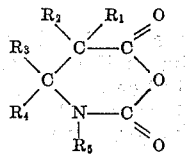

wherein the R's are hydrogen or organic radicals and wherein the total number of carbon atoms is between 5 and 14, inclusive (one carbon atom is added to the amino acid during the formation of the N-carboanhydride) and the carbon alpha to the carbonyl group is aliphatic and bears only single bonds. Thus at least one of the R's is a radical containing at least one carbon atom. The preferred compounds are of course those in which all of the R's are hydrogen or hydrocarbon radicals, preferably aliphatically saturated, at least one of the R's being a hydrocarbon radical of at least one carbon. This is for the reason that amino acids which, apart from the amino and the carboxyl groups, are hydrocarbon, react with phosgene cleanly and without side reactions, in comparison to the amino acids which contain substituents such as hydroxyl or mercapto. However, beta-amino acids having inert substituents such as alkoxy or aryloxy are entirely suitable, as are those which have protected (e. g., acylated) hydroxyl, amino or mercapto groups. In the formula given above the substituents on the carbons alpha and beta to the carbonyl group may, separately or together, form a nonaromatic five or six carbon ring such as cyclopentane or cyclohexane. Preferably the total number of carbon atoms in the N-carboanhydride is between 5 and 11, inclusive.

As has been shown in the examples, a convenient method of preparing the N-carboanhydrides of beta-amino acids consists in reacting the amino acid with phosgene under anhydrous conditions. Instead of the amino acid there may be used its dry alkali metal (e. g. sodium or potassium) salt with similar results. The reaction takes place at temperatures between —70 and 100° C. or even higher, depending on the stability of the N-carboanhydride, the preferred range being between —10 and +65° C. Sealed vessels must of course be used at the higher temperature since phosgene boils at 8° C. Preferably there is used a diluent inert to phosgene to facilitate contact, this diluent being desirably a solvent for the N-carbonanhydrides. Examples of such diluents are chloroform, carbon tetrachloride, benzene, diethyl ether, etc. Excess phosgene may be used as the diluent. The N-carboanhydride may be isolated by any suitable method, the most convenient being solution in an appropriate solvent and filtration from the unreacted amino acid or alkali metal salt (and alkali chloride if an alkali metal salt is used) and evaporation of the solvent, followed by recrystallization if desired. In view of the sensitivity to heat and to water of the N-carboanhydrides, these operations should be conducted as much as possible at low or ordinary temperature and with exclusion of atmospheric moisture.

The N-carboanhydrides may be polymerized by a variety of methods including thermal decomposition as such or in a solvent such as chloroform or meta-cresol, or by water-catalyzed polymerization in a non-polar solvent such as benzene at ordinary or elevated temperature, or by treatment with or without solvent with catalytic amounts of an active hydrogen-containing material, e. g. an alcohol or a basic nitrogen-containing compound such as a primary or secondary amine. In all cases evolution of carbon dioxide takes place with formation of a polyamide. The polyamides thus obtained have the generic formula

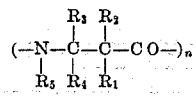

wherein the R's have the significance already indicated for the N-carboanhydrides and $n$ is an integer indicating the degree of polymerization. A useful index of the degree of polymerization is the intrinsic viscosity, as defined for example in U. S. Patent 2,130,948 or in "Advances in Colloid Science," vol. II, p. 209.

These polyamides are in general solid crystalline materials insoluble in water but soluble in certain active organic solvents of which m-cresol and formic acid are representative. They have in general high melting points, usually well above 100° C. although this depends in a large measure on the nature of the substituents on the polymer chain. Those polyamides whose degree of polymerization is sufficiently high can be extruded or spun from melt or from solution to give shaped materials such as fibers, films, ribbons, tubes, etc. The polyamides are also useful as film-forming ingredients in coating compositions, ingredients for molding powders, etc.

The polymerization of the N-carboanhydrides of beta-amino acids may involve mixtures of two or more different monomers, or it may be conducted with mixtures of N-carboanhydrides of beta-amino acids with N-carboanhydrides of alpha-amino acids. In this manner copolymers are obtained, which are in general characterized by greater solubility in the common organic solvents than the polyamides obtained from one monomer alone.

The polyamides which are obtained from the N-carboanhydrides of those beta-amino acids of at least 4 carbons wherein the amino nitrogen is unsubstituted and the carbon alpha to the carboxyl, in addition to being aliphatic in nature and bearing only single bonds, bears at least one hydrogen atom, have not been previously described. This is probably because such polyamides are not obtainable directly from the amino acids or their amide-forming derivatives. These polyamides are linear polymers having recurring structural units of the general formula

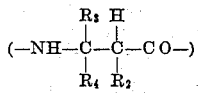

wherein the R's are hydrogen or hydrocarbon radicals, one of them at least being a hydrocarbon radical of at least one carbon. Of this special class of polyamides the preferred ones from the standpoint of availability of the amino acids are those in which the carbon alpha to the carbonyl is unsubstituted, i. e., those having recurring structural units of the general formula

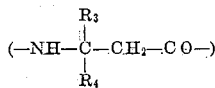

The method herein described, i. e., the polymerization of the N-carboanhydrides of beta-amino acids, makes this particular type of polyamides accessible, as well as the other polyamides of unit length four wherein the amido nitrogen and alpha carbon are substituted.

As many apparently widely different embodiments of this invention may be made without departing from the spirit and scope thereof, it is to be understood that this invention is not limited to the specific embodiments thereof except as defined in the appended claims.

I claim:

1. An N-carboanhydride of a beta-amino carboxylic acid which acid has a non-aromatic alpha carbon atom bearing solely single bonds and has at least one hydrogen atom on the amino nitrogen, said N-carboanhydride containing at least 5 and not more than 14 carbon atoms, and being free from aliphatic carbon-carbon unsaturation.

2. An N-carboanhydride of a beta-amino carboxylic acid which acid has a non-aromatic alpha carbon atom bearing solely single bonds and has at least one hydrogen atom on the amino nitrogen, said N-carboanhydride, apart from the amino and the carboanhydride groups, consisting solely of hydrocarbon, containing at least 5 and not more than 14 carbon atoms, and being free from aliphatic carbon-carbon unsaturation.

3. An N-carboanhydride of a beta-amino carboxylic acid which acid has a non-aromatic alpha carbon atom bearing solely single bonds and at least one hydrogen atom and has solely hydrogen atoms on the amino nitrogen, said N-carboanhydride containing at least 5 and not more than 14 carbon atoms, and being free from aliphatic carbon-carbon unsaturation.

4. A linear polymer having recurring structural units of the general formula

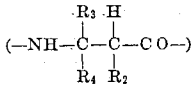

wherein the R's are selected from the group consisting of hydrogen and hydrocarbon radicals free from aliphatic carbon-carbon unsaturation, at least one of said R's being a hydrocarbon radical any remaining recurring structural units of said polymer being alpha-amino acid units.

5. A polymer according to claim 4 wherein the carbon alpha to the carbonyl in the beta-amino acid units bears two hydrogens.

6. A process for the preparation of the N-carboanhydride of a beta-amino carboxylic acid which acid has a non-aromatic alpha carbon atom bearing only single bonds, has at least one hydrogen on the amino nitrogen, is free from aliphatic carbon-carbon unsaturation and contains from 4 to 13 carbon atoms which comprises reacting a member of the class consisting of said amino acids and their alkali metal salts with phosgene under anhydrous conditions.

7. Process of claim 6 wherein the reaction is conducted in the presence of an inert solvent.

8. An N-carboanhydride of a beta-primary amino-alkanoic acid of 4 to 13 carbon atoms.

9. Process for the preparation of the N-carboanhydride of a beta-primary amino-alkanoic acid of 4 to 13 carbon atoms which comprises reacting said acid with phosgene in an anhydrous inert solvent.

10. A linear polymer the recurring structural units of which are of the general formula

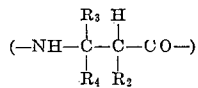

wherein the R's are selected from the group consisting of hydrogen and hydrocarbon radicals free from aliphatic carbon-carbon unsaturation, at least one of said R's being a hydrocarbon radical.

11. A polymer according to claim 10 wherein the carbon alpha to the carbonyl in the beta-amino acid units bears two hydrogens.

12. An N-carboanhydride of a beta-primary amino carboxylic acid which acid has a non-aromatic alpha carbon atom, contains only hydrogen, the amino nitrogen, the carboxyl oxygens and 4 to 13 carbon atoms, and is free from aliphatic carbon-carbon unsaturation.

13. An N-carboanhydride of a beta-amino carboxylic acid which acid has a non-aromatic alpha carbon atom bearing solely single bonds and has at least one hydrogen atom on the amino nitrogen, said N-carboanhydride containing at least 5 and not more than 14 carbon atoms, having, on the carboanhydride ring only inert substituents, and being free from aliphatic carbon-carbon unsaturation.

14. An N-carboanhydride of a beta-primary amino acid which acid has the alpha and beta carbons as portions of a saturated cycloaliphatic ring of 5 to 6 carbons, contains only hydrogen, the amino nitrogen, the carboxyl oxygens, and is free from aliphatic carbon-carbon unsaturation.

15. The N-carboanhydride of alpha-alpha-dimethyl-beta-aminopropionic acid.

16. The N-carboanhydride of beta-aminobutyric acid.

17. The N-carboanhydride of beta-phenyl-beta-aminopropionic acid.

18. A linear polyamide having recurring beta-primary monoamino monocarboxylic acid units which units have the —NH— group and the —CO— group on adjacent non-aromatic carbon atoms, have hydrogen on the carbon alpha to the —CO— group, are free from aliphatic carbon-carbon unsaturation, are hydrocarbon except for the —NH— and —CO— groups and have a hydrocarbon radical on one of the carbons linking the —NH— and —CO— groups, any remaining recurring structural units of said polymer being alpha-amino acid units.

19. A linear polyamide having recurring beta-primary monoamino monocarboxylic acid units which units have the —NH— group and the —CO— group on adjacent non-aromatic carbon atoms, have two hydrogens on the carbon alpha to the —CO— group, are free from aliphatic carbon-carbon unsaturation, are hydrocarbon except for the —NH— and —CO— groups and have a hydrocarbon radical on one of the carbons linking the —NH— and —CO— groups any remaining recurring structural units of said polymer being alpha-amino acid units.

HILMER ERNEST WINBERG.

(References on following page)

References Cited

The following references are of record in the file of this patent:

UNITED STATES PATENTS

| Number | Name | Date |
|---|---|---|
| 2,327,162 | Baldwin et al. | Aug. 17, 1943 |
| 2,333,752 | Ufer | Nov. 9, 1943 |
| 2,356,516 | Hagedorn | Aug. 22, 1944 |
| 2,500,317 | Lincoln | Mar. 14, 1950 |
| 2,534,283 | McDonald | Dec. 19, 1950 |

FOREIGN PATENTS

| Number | Country | Date |
|---|---|---|
| 15,208 of 1899 | Great Britain | May 5, 1900 |
| 849,348 | France | Nov. 21, 1939 |

OTHER REFERENCES

Woodward et al.: J. Am. Chem. Soc., vol. 69, June 1947, pp. 1551–52.

Leuchs et al.: Berichte, Deut. Chem. Gesell., vol. 40, 1907, pp. 3235–49.

Leuchs et al.: Berichte, Deut. Chem. Gesell., vol. 41, 1908, pp. 1721–26.

Curtius et al.: Berichte, Deut. Chem. Gesell., vol. 55, 1922, pp. 1543–58.

Go et al.: Bull. Chem. Soc. Japan, vol. 14, pp. 510–16 (1939), Chem. Abs. 34, 1971.

Carothers Collected Papers, Interscience, 1940, pp. 112–13.